WILLIAM SCOTT, OF HIGH BANKS, INDIANA.

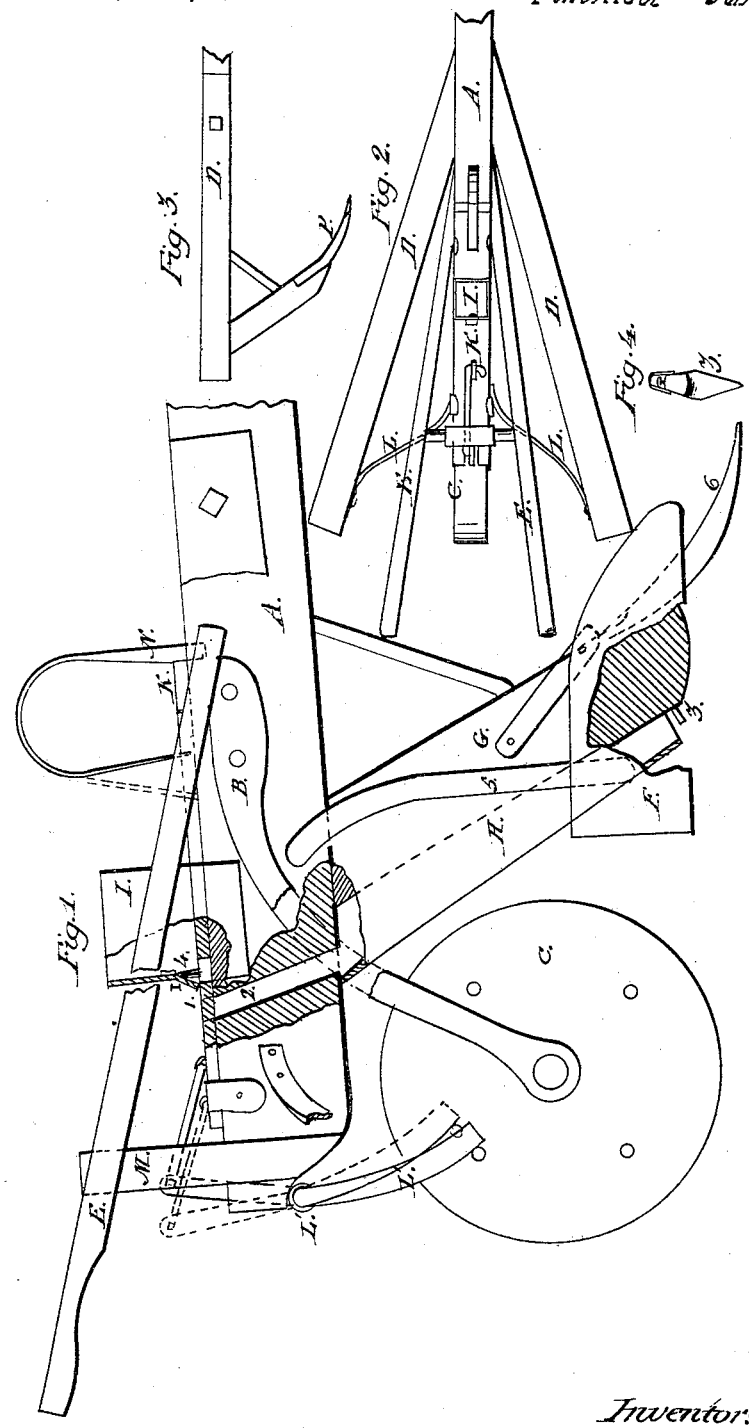

Letters Patent No. 86,105, dated January 19, 1869.

IMPROVEMENT IN COMBINED CORN-PLANTER AND CULTIVATOR.

The Schedule referred to in these Letters Patent and making part of the same.

*To all whom it may concern:*

Be it known that I, WILLIAM SCOTT, of High Banks, in the county of Pike, and State of Indiana, have invented a new and useful Improved Combined Corn-Planter and Cultivator; and I do hereby declare that the following is a full, clear, and exact description of the same, reference being had to the annexed drawings, making part of this specification, in which—

Figure 1 is a side elevation of the planter, the cultivator being removed, and a portion of the same being broken away to show the passage through which the corn passes as it leaves the distributer, and having also a portion of the covering-shovel broken away, to show the spreader upon which the seed strikes as it leaves the conductor;

Figure 2 is a plan view of the planter, with the cultivator attached;

Figure 3 is a side elevation of one arm of the cultivator; and

Figure 4 is a plan view of the seed-spreader at the mouth of the conductor H.

Corresponding letters and figures refer to corresponding parts in the several figures.

The object of this invention is an improvement in combined seed-planters and cultivators, and its nature will be made apparent by the following description and claims.

A is the beam of the planter, which is of sufficient size and strength to admit of the other portions of the device being secured to it.

B B are brace or arms, attached to the beam A, which extend downward, and receive, in holes formed in their lower ends, the opposite ends of the shaft of the wheel C.

C is a drum, or wheel, the journals of which run in the bearings formed in the lower ends of braces B B. This drum is of suitable diameter, say two feet, and is provided, in one of its heads, with pins placed at proper intervals to act upon a lever for the purpose of moving the slide which controls the outlet of the seed-box.

D D are arms, which are attached to the beam A, and which extend rearward to or beyond the rear end of said beam.

To the rear ends of these arms a brace, 4, is attached, which secures their position, the opposite end of said brace being attached to the beam.

These arms, with the shovels which are secured to them in the usual manner, constitute the cultivator, and it will be apparent that they may at any time be taken off and laid aside, and the seed-planter used without them.

E E are the handles, which are of ordinary construction, and are secured to the beam in the usual manner.

F F are shovels, which may be termed covering-shovels, and which are secured to the arm G, on either side thereof, their rear ends being so curved that, as the seed passes down through the delivery-spout H into the furrow formed by the shovel O, it will be covered by said shovels.

G is the arm above referred to, which is secured to the under side of the beam, and is held in position by suitable braces, it carrying, upon its lower end, the shovel O, which forms the furrow for the reception of the seed.

H is a tube or conductor for the seed to be planted, which may be made of sheet-metal, or of wood, or of any other suitable material, and secured to the rear side of the arm G.

I is the seed-box, which is placed upon the top of beam A, and may be constructed to contain any desired quantity of seed.

K is a slide, which is arranged upon the top of beam A, and so as to work through the seed-box in the line of the motion of the plow. This slide has an aperture in it for the reception of the seed, as seen at 1, fig. 1.

L' is a rock-shaft, which is secured in bearings upon the rear end of the beam, it having two arms projecting therefrom, one downward, and the other upward, it being so arranged that the lower arm passes down by the side of the drum, or wheel, and comes in contact with the pins inserted in the head of said drum, as above stated.

It will be observed that, as the pins come in contact with the lower arm of the shaft, it will be carried forward, and, that, consequently, the upper arm of said shaft will be carried backward, which movement will also carry the slide K, it being connected with the arm on the rock-shaft by means of a rod constructed for the purpose.

The above-indicated motion of slide K will bring the aperture 1 formed in its face, which has previously been filled with seed, into communication with the passage 2 in the beam, which will permit the seeds to fall down through the conductor H, and be covered by the shovels F.

M is a standard, attached to the rear end of the plow-beam, for the purpose of supporting the handles.

N is a spring, secured to the beam, its opposite end being inserted into the slide K for the purpose of returning it to its position after it has been withdrawn by the lever L.

O is the shovel of the planter, and

P are those attached to the cultivator.

1 is the distributing-slide above referred to, and 2 is the passage through the beam for the seeds to be planted.

3 is a T-shaped piece of metal, secured to the arm G, just within the mouth of conductor H, or just below the same, it being for the purpose of scattering the seeds as they fall upon the ground.

4 is a brush, made of heavy bristles, or it may be of fine wire, which is secured to the inside of seed-box I, in such a position that the projecting ends of the bristles or wires will rest upon the slide K, when in its normal position, and will sweep its surface as it is withdrawn, by doing which it will prevent any grain or seeds from being crushed between the edges of the slide and the seed-box, when the slide is withdrawn, which is regarded as of great importance.

Having thus described my invention,

What I claim, and desire to secure by Letters Patent, is—

1. The construction of the seed-distributer 3, and its arrangement with reference to the conductor H, substantially as shown and described.

2. The combination of the seed-distributer 3, passage or conduit 2, and seed-conductor H, substantially as shown and described.

In testimony whereof, I have signed my name to this specification, in the presence of two subscribing witnesses.

WILLIAM SCOTT.

Witnesses:
JAMES BROCK BRETT,
FERDINAND F. SCOTT.